(12) United States Patent
Cormier et al.

(10) Patent No.: US 9,708,417 B2
(45) Date of Patent: Jul. 18, 2017

(54) NANOPARTICLES AND FILMS COMPOSED OF WATER-INSOLUBLE GLUCAN

(71) Applicant: The United States of America, as represented by the Secretary of Agriculture, Washington, DC (US)

(72) Inventors: Ryan Cormier, Morton, IL (US); Gregory L. Cote, Edwards, IL (US); Christopher D. Skory, Washington, IL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 154 days.

(21) Appl. No.: 14/702,960

(22) Filed: May 4, 2015

(65) Prior Publication Data

US 2016/0326268 A1    Nov. 10, 2016

(51) Int. Cl.
*C08B 37/00*     (2006.01)
*C08L 5/00*      (2006.01)

(52) U.S. Cl.
CPC ...... *C08B 37/0006* (2013.01); *C08B 37/0009* (2013.01); *C08L 5/00* (2013.01)

(58) Field of Classification Search
CPC ... C08B 37/0006; C08B 37/0009; C08L 5/00; Y10T 428/2982
USPC .......................................................... 428/402
See application file for complete search history.

(56) References Cited

U.S. PATENT DOCUMENTS

| | | | |
|---|---|---|---|
| 7,000,000 B1 * | 2/2006 | Turner | C12P 19/08 536/123.12 |
| 2013/0016186 A1 * | 1/2013 | Atanassov | H04N 13/0246 348/47 |
| 2013/0161562 A1 * | 6/2013 | O'Brien | C09K 3/00 252/363.5 |
| 2013/0244288 A1 * | 9/2013 | O'Brien | C12P 19/18 435/97 |

* cited by examiner

*Primary Examiner* — Leszek Kiliman
(74) *Attorney, Agent, or Firm* — G. Byron Stover; John D. Fado (57) ABSTRACT

Nanoparticles composed of water insoluble glucans and films composed of tile above nanoparticles, in addition, there is disclosed a process for producing nanoparticles composed of water insoluble glucans. Furthermore, surfactant stabilized nanoparticles composed of water insoluble glucans and films composed of the above nanoparticles. In addition, a process for producing surfactant stabilized nanoparticles composed of water insoluble glucans.

12 Claims, 8 Drawing Sheets
(3 of 8 Drawing Sheet(s) Filed in Color)

NANOPARTICLES AND FILMS COMPOSED OF WATER-INSOLUBLE GLUCAN

BACKGROUND OF THE INVENTION

Described herein are nanoparticles composed of water insoluble glucans, the nanoparticles produced by a process involving suspending water insoluble glucans in water to produce a suspension, homogenizing the suspension in a high pressure homogenizer for about 10 to about 60 times to produce a clear suspension containing the nanoparticles, and filtering the suspension using a filter to purify the nanoparticles. Also films composed of the above nanoparticles. In addition, there is disclosed a process for producing nanoparticles composed of water insoluble glucans, the process involving suspending water insoluble glucans in water to produce a suspension, homogenizing the suspension in a high pressure homogenizer for about 10 to about 60 times to produce a clear suspension, and filtering the suspension using a filter to purify nanoparticles.

Furthermore, there are described surfactant stabilized nanoparticles composed of water insoluble glucans, the nanoparticles produced by a process involving dissolving water insoluble glucans in a basic solution to form a glucan solution, adding the glucan solution to an alcohol solution containing a surfactant while stirring followed by cooling at about 0° C. to about 10°C. and sonication at about 180 to about 420 watts at about a 50% pulse rate (e g., 50%) for about 3 to about 7 minutes to form a suspension containing nanoparticles, centrifuging the suspension to isolate the precipitate, adding deionized water to the precipitate and dialyzing against deionized water to remove excess surfactants and base; if the surfactant is poly(vinyl alcohol) then the surfactant is not in the alcohol solution but is in the deionized water. Also films composed of the above nanoparticles. In addition, a process for producing surfactant stabilized nanoparticles composed of water insoluble glucans, the process involving dissolving water insoluble glucans in a basic solution to lot form a glucan solution, adding the glucan solution to an alcohol solution containing a surfactant while stirring followed by cooling at about 0° C. to about 10° C. and sonication at about 180 to about 420 watts at about a 50% pulse rate for about 3 to about 7 minutes to form a suspension containing nanoparticles, centrifuging the suspension to isolate the precipitate, adding deionized water to the precipitate and dialyzing, against deionized water to remove excess surfactants and base; if the surfactant is poly(vinyl alcohol) then the surfactant is not in the alcohol solution but is in the deionized water.

The future availability and the generally rising cost of fossil fuels as feedstock for the manufacturing of synthetic polymers has initiated a rapidly expanding drive for the discovery and commercialization of polymeric materials from renewable sources. The production capacity of bin-based polymers is expected to rise from 3.5 to 12 million metric tons by 2020 (Dammer, L., et al., Market Developments of and Opportunities for Biobased Products and Chemicals, 2013). This growth, however, only represents 3% of the polymer industry as a whole. In order for bin-based polymers to become a more significant share of the market, novel uses for these materials need to be developed and evaluated. Products of this nature produced via inexpensive and renewable starting materials could increase innovation and decrease the eventual end user cost.

Our laboratory has a long-standing interest in the production of biopolymers produced by bacterial glycansucrases from sucroses such as dextran, levan, and alternan (Leathers. T. D., Dextran, IN Biopolymers. Polysaccharides. I. Polysaccharides from Prokaryotes, Vandamme, E. DeBaets, S., Steinbüchel, A., Eds., Wiley-VCH, Weiheim, Germany, 2002, pp. 299-321; Cote, G. L., and J. Ahlgren, a Levan and Levansucrase. In Science and Technology of Fructans, Suzuki, M., Chatterton, N. J., Eds., CRC Press, Inc., Boca Raton, Fla., 1993, pp. 141-168; Cote, G. L. Alternan. IN Biopolymers. Polysaccharides, I. Polysaccharides from Prokaryotes, Vandamme, E., DeBaets, S., Steinbüchel, A., Eds., Wiley-VCH, Weiheim, Germany, 2002, pp. 323-350). We have, recently described enzymes from food-grade lactic acid bacteria that produce water-insoluble glucans from sucrose (Côté, G. L., and C. D., Skory, Appl. Microbiol. Biotechnol., 93: 2387-2394 (2012); Côté, G. L., et al., Appl. Microbiol. Biotechnol., 97; 7265-7273 (2013); Côté, G. L., and C. D. Skory, Appl. Microbiol. Biotechnol., 98: 6651-6658 (2014)). These glucans are found in fermented foods and beverages, and are commonly encountered in ginger beer and water kefir fermentations (Pidoux, M., et al., Carbohydr. Polym., 13: 351-362 (1990); Waldherr, F. W., et al., Food Microbiol. 27: 672-678 (2010)). They are insoluble in water due to the preponderance of sequences of $\alpha(1\rightarrow 3)$-linked D-glucopyransosyl units, although $\alpha(1\rightarrow 6)$-linked sequences are also present. A single enzyme is responsible for the synthesis of the glucan and can be readily used in vitro to synthesize water-insoluble gels directly from sucrose. Significant attention from industry on water insoluble glucans has resulted in several patents on the production and utility of similar glucans (U.S. Patent Application Publication No. 2013/0244288; U.S. Pat. No. 7,000,000; U.S. Patent Application Publication No, 2013/0161562; U.S. Patent Application Publication No. 2013016186). Harsh conditions such as dissolution in extremely alkaline solutions or ionic liquids were required to obtain new materials, which can be difficult or expensive to adopt on a larger scale.

The nature of these glucans, mainly their insolubility in water, makes them interesting candidates as the starting materials for nanoparticles. Nanoparticles have been shown to be an efficient technology in delivery medicine (Kumari, A., et al., Colloids Surf. B. Biointerfaces., 75: 1-18 (2010)), provide a variety of improvements to the automotive industry (Mohseni, M. et al., New Advances in Vehicular Technology and Automotive Engineering, Chapter 1, pages 3-54 (2012)), in cosmetics (Raj, S., et al., J. Pharm. Bioallied. Sci., 4: 186-193 (2012)), and many other industries. The use of renewable resources in these systems could only increase their value to society.

We have produced nanoparticles through the use of high-pressure homogenization of water-insoluble glucans which have significant utility on their own or as precursors to new materials.

SUMMARY OF THE INVENTION

Nanoparticles composed of water insoluble glucans, the nanoparticles produced by a process involving suspending water insoluble glucans in water to produce a suspension, homogenizing the suspension in a high pressure homogenizer for about 10 to about 60 times to produce a clear suspension containing the nanoparticles, and filtering the suspension using a filter to purify the nanoparticles. Also films composed of the above nanoparticles. In addition, there is disclosed a process for producing nanoparticles composed of water insoluble glucans, the process involving suspending water insoluble glucans in water to produce a suspension, homogenizing the suspension in a high pressure homogenizer for about 10 to about 60 times to produce a clear suspension, and filtering the suspension using a filter to purify nanoparticles.

Furthermore, surfactant stabilized nanoparticles composed of water insoluble glucans, the nanoparticles produced by a process involving dissolving water insoluble glucans in a basic solution to form a glucan solution, adding the glucan solution to an alcohol solution containing a surfactant while stirring followed by cooling at about 0° C. to about 10° C. and sonication at about 180 to about 420 watts at about a 50% pulse rate (e.g., 50%) for about 3 to about 7 minutes to form a suspension containing nanoparticles, centrifuging the suspension to isolate the precipitate, adding deionized water to the precipitate and dialyzing against deionized water to remove excess surfactants and base; if the surfactant is poly(vinyl alcohol) then the surfactant is not in the alcohol solution but is in the deionized water. Also films composed of the above nanoparticles. In addition, a process for producing surfactant stabilized nanoparticles composed of water insoluble glucans, the process involving dissolving water insoluble glucans in a basic solution to form a glucan solution, adding the glucan solution to an alcohol solution containing a surfactant while stirring followed by cooling at about 0° C. to about 10° C. and sonication at about 180 to about 420 watts at about a 50% pulse rate for about 3 to about 7 minutes to form a suspension containing nanoparticles, centrifuging the suspension to isolate the precipitate, adding deionized water to the precipitate and dialyzing against deionized water to remove excess surfactants and base; if the surfactant is poly(vinyl alcohol) then the surfactant is not in the alcohol solution but is in the deionized water.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Described herein are nanoparticles composed of water insoluble glucans, the nanoparticles produced by a process involving suspending water insoluble glucans in water to produce a suspension, homogenizing the suspension in a high pressure homogenizer for about 10 to about 60 times to produce as clear suspension containing the nanoparticles, and filtering the suspension using a filter to purify the nanoparticles. Also films composed of the above nanoparticles. In addition, there is disclosed a process for producing nanoparticles composed of water insoluble glucans, the process involving suspending water insoluble glucans in water to produce a suspension, homogenizing the suspension in a high pressure homogenizer for about 10 to about 60 times to produce a clear suspension, and filtering the suspension using a filter to purify nanoparticles.

Furthermore, there are described surfactant stabilized nanoparticles composed of water insoluble glucans, the nanoparticles produced by a process involving dissolving water insoluble glucans in a basic solution to form a glucan solution, adding the glucan solution to an alcohol solution containing a surfactant while stirring followed by cooling at about 0° C. to about 10° C. and sonication at about 180 to about 420 watts at about as 50% pulse rate (e.g., 50%) for about 3 to about 7 minutes to form a suspension containing nanoparticles, centrifuging the suspension to isolate the precipitate, adding deionized water to the precipitate and dialyzing against deionized water to remove excess surfactants and base; if the surfactant is poly(vinyl alcohol) then the surfactant is not in the alcohol solution but is in the deionized water. Also films composed of the above nanoparticles. In addition, a process for producing surfactant stabilized nanoparticles composed of water insoluble glucans, the process involving dissolving water insoluble glucans in a basic solution to form a glucan solution, adding the glucan solution to an alcohol solution containing a surfactant while stirring followed by cooling at about 0° C. to about 10° C. and sonication at about 180 to about 420 watts at about a 50% pulse rate for about 3 to about 7 minutes to form a suspension containing nanoparticles, centrifuging the suspension to isolate the precipitate, adding deionized water to the precipitate and dialyzing against deionized water to remove excess surfactants and base; if the surfactant is poly(vinyl alcohol) then the surfactant is not in the alcohol solution but is in the deionized water.

We have produced nanoparticles through the use of high-pressure homogenization of water-insoluble glucans, which have significant utility on their own or as precursors to new materials. To our knowledge, these are the first and only examples of nanoparticles made from unmodified alpha-glucans. Without being bound by theory, we postulate that the assembly of the nanoparticles can be partially attributed to the nature of the α-(1→3)-linked and α-(1→6)-linked D-glucose units in the glucan. High-pressure homogenization of the glucan could force the rigid α-(1→3)-linked regions responsible for the insolubility into the center of a forming sphere while α-(1→6)-linked regions assembled on the surface in order to maximize the hydrophilic interaction with the aqueous media. More experimentation however, is needed to determine the exact mechanism of the nanosphere formation.

The use of high-pressure homogenization to create nano-sized adaptations has been demonstrated to produce nanocellulose (NC) from a variety of sources (Li, J., et al., Carbohydr. Polym., 90: 1609-1613 (2012)); Kaushik, A., and M. Singh, Carbohydr. Res., 346: 76-85 (2011)); Hubbe, M., et al., BioResources, 3; 929-980 (2008)). NC has been shown to be beneficial for a variety of applications such as reinforcing resins, producing films, fibers and gels, as well as producing incredibly tough cellulose nanopaper (Nakagaito. A. N., and H. Yano, Appl. Phys. A. 80: 155-159 (2003); Liimatainen, H., et al., ACS Appl. Mater. Interfaces, 5: 13412-13418 (2013); Henricksson, M., et al., Biomacromolecules, 9: 1579-1585 (2008); Pääkkö, M., et al., Biomacromolecules, 8: 1934-1941 (2007)). However, significant pretreatment procedures are required, adding time and cost to the production of nanocellulose. Our nanoparticles are of a completely different physical structure, but nanocelluose provides a good comparison to the potential impact this system could have on related industries.

The nanoparticle suspensions have also been found to form clear films upon the removal of water forcing the particles to adhere to one another. These films are easily formed (simply evaporate the water), clear, flexible and have some degree of strength. The use of other additives such as cellulose nanofibers works to increase the strength and flexibility of these films.

Our research done concurrently with the homogenized nanoparticles resulted in the synthesis of surfactant stabilized nanoparticles.

Synthesis of Nanoparticles (Homogenization): Dry glucan (e.g., polysaccharides in Table 1) was suspended in deionized water at neutral pH and allowed to stir for time sufficient to adequately disperse the glucan. The concentration of the suspension prepared is determined by the high pressure homogenizer (generally pressure of about 35 to about 200 MPa (e.g., 35-200 MPa) used for the next step. Generally, up to 5% solid content (wt %) was tolerated. Temperature was not maintained. This was then homogenized with a high pressure homogenizer for about 10 to about 60 passes (e.g., 10-60) at pressures of 35, 70 and 200 MPa until a clear suspension was obtained. This suspension was filtered through a syringe filter (e.g., 0.45 microns). While any temperature at which water is a liquid is acceptable, care should be taken to prevent loss of liquid during the homogenization process. Generally room temperature is preferable; however ice can be used to cool the process to minimize loss of water. Unless specifically stated (e.g., the surfactant stabilized nanoparticle process) the suspensions were unadjusted for pH. Ideally suspensions will have a pH of about 5 to about 7 (e.g., 5-7). The process may be done outside of this range, however one needs to take care that the process does not cause chemical decomposition of the glucan, particularly during the homogenization process where sheer and temperature are increased.

Synthesis of Surfactant Stabilized Nanoparticles: the glucan (e.g., 100 mg) was dissolved in a basic solution (generally at least about 0.4 molar sodium hydroxide (e.g., 20 mL, of 1 M; any aqueous base of sufficient strength to dissolve the glucan may be used, such as KOH, ethanolamine, etc., preferably a strong inorganic base). This mixture was added slowly to an alcohol solution (e.g., 40 mL absolute ethanol solution; other alcohols can be used provided the alcohol causes complete precipitation of the previously dissolved polymer and dissolves the surfactant) containing 0.25% (w/v) surfactant (e.g., Pluronic® F-68) via syringe pump (e.g., 1 ml per minute) while stirring at vortexing speed. The mixture was placed in an ice bath and then sonicated using a 600 watt Tekmar sonic disruptor for about five minutes (generally 40% power output, 50% pulse) to produce nanoparticles. This suspension was then briefly centrifuged and the resulting supernatant was decanted. Fresh deionized water was added to the precipitated particles. The suspensions were then dialyzed against deionized water to remove excess surfactants and neutralize the aqueous media. Examples of surfactants are shown in Table 3, although other surfactants may be used. Poly(vinyl alcohol) is a polymeric surfactant, its name contains "alcohol" due to the monomer of this polymer bearing an alcohol moiety (vinyl alcohol), in the general sense, alcohols (those commonly considered as solvents) cannot be used as surfactants; however, surfactants that contain an alcohol functional group may be used. Whether other surfactants can be used is a matter of routine experimentation. In the case of poly(vinyl alcohol)(PVA) coated nanoparticles, the surfactant (PVA) was not added initially into the ethanol; after centrifugation, the suspension was dialyzed against an aqueous solution (e.g., 0.25% w/v) of poly(viny alcohol).

Film Formation: The nanoparticle suspension prepared via homogenization (described above) was poured into a non-stick container (e.g., PTFE, silicone) and allowed to air dry in a dust free environment. Once the water was completely evaporated (determined visually) the film was removed. The addition of cellulose nanofibers can be performed before homogenization or after (provided adequate mixing occurs).

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a roaming agent.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

The glucans used in this study were synthesized as described in Table 2 or using either glucansucrase purified from *Leuconostoc mesenteroides* strains (as described in Table 2), cloned glucansucrase, DsrI, from *Leuconostoc mesenteroides* NRRL B-1118, recombinantly expressed in *E. coli* as previously described (Côté, G. L. and C. D. Skory, Appl. Microbiol. Biotechnol., 93: 2387-2394 (2012)), or DsrI extracellularly expressed in *Lactococcus lactis* LMO0230. The *L. lactis* expression system consisted of the DsrI gene cloned into plasmid pMSP3535H3 (Oddone, G. M., et al., Plasmid, 61: 151-158 (2009)) under control of the nisin induced promoter nisA along with an usp45 secretion signal (van Asseldonk, M., et al., Mol. Gen. Genet., 240: 428-434 (1993)) included to facilitate extracellular production of enzyme. Plasmids utilizing modified DsrI as previously described (Côté, G. L. and C. D. Skory, Appl. Microbiol. Biotechnol. 98: 6651-6658 (2014)) were identically constructed in pMSP3535H3 except for a single amino acid alteration at threonine-654. *L. lactis* LM0230 (Efstathiou. J. D. and L. L. McKay, J. Bacteriol., 130:257-265 (1977)) transformed with these plasmid constructs were grown in M17 growth medium (supplemented with 50 g/L glucose, 10 µg/ml erythromycin and 5 mM CaCl2) using 1.0 L DasGip (Jülich, Germany) parallel pH-controlled bioreactors maintained at pH 6.0 with NaOH 30° C., and stirring at 100 rpm. When *L. lactis* cultures reached an approximate $OD_{600}$=1.0, nisin was added to a final concentration of 800 ng/ml to induce production of DsrI. Growth was then allowed to continue as before for an additional 18-24 hours before harvesting cultures and removing cells by centrifugation. Culture fluid was concentrated and dialyzed against 20 mM. pH 5.6 sodium acetate buffer containing 2 mM calcium chloride and 1.5 mM sodium azide using a tangential-flow ultrafiltration apparatus with a 100,000 MW cutoff membrane. This concentrate was used as the enzyme preparation without further purification. A 300 mM solution of sucrose in the same acetate buffer was incubated at room temperature with the enzyme preparation and the reaction was judged to be complete when all sucrose had been consumed, as indicated by TLC. The resulting insoluble gel-like material was washed with distilled water to remove residual sugars, and was then either air-dried or lyophilized. Our recently submitted manuscript (Côté, G. L., and C. D. Skory, C. D. "Water-insoluble glucans from sucrose via glucansucrases. Factors influencing structures and yields" (*ACS Symposium Series, Green Polymer Chemistry III: Biobased Materials and Biocatalysis*, accepted Dec. 15, 2014) provides evidence that the enzymes from NRRL strains B-523 and B-1118 of *Leucanostoc mesenteroides* produced essentially identical water-insoluble glucans, and there is no reason to suspect that one cannot be substituted for the other in this application. Likewise, the enzyme may also be expressed in and obtained from other host organisms, e.g., *E. coli*, as described by Cote & Skory in 2012 (Côté, G. L., and C. D. Skory, Applied Microbiology and Biotechnology, 93(6): 2387-2394 (2012))

Figure 1:
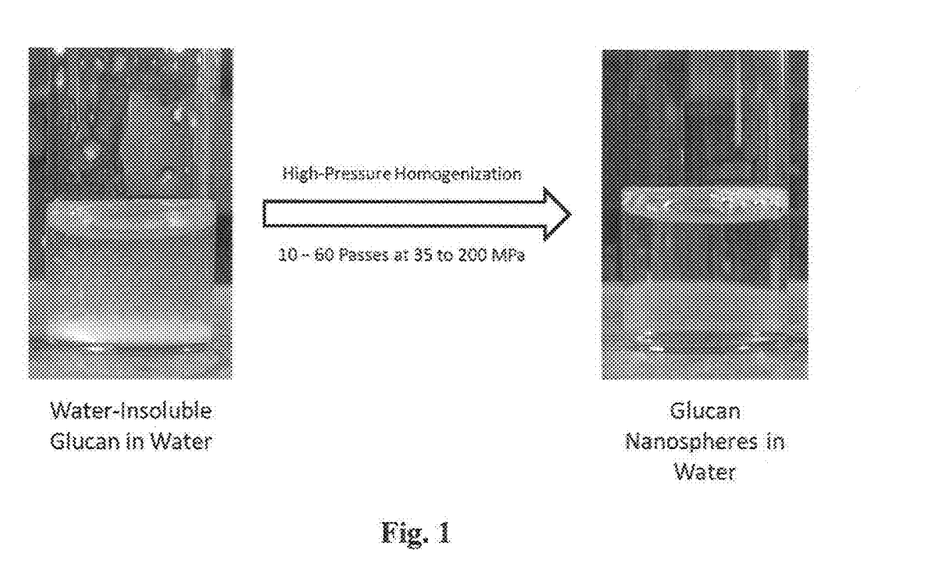
FIG. 1 shows treatment of water-insoluble glucan (B-1118-WT) by homogenization as described below.
Figure 2:
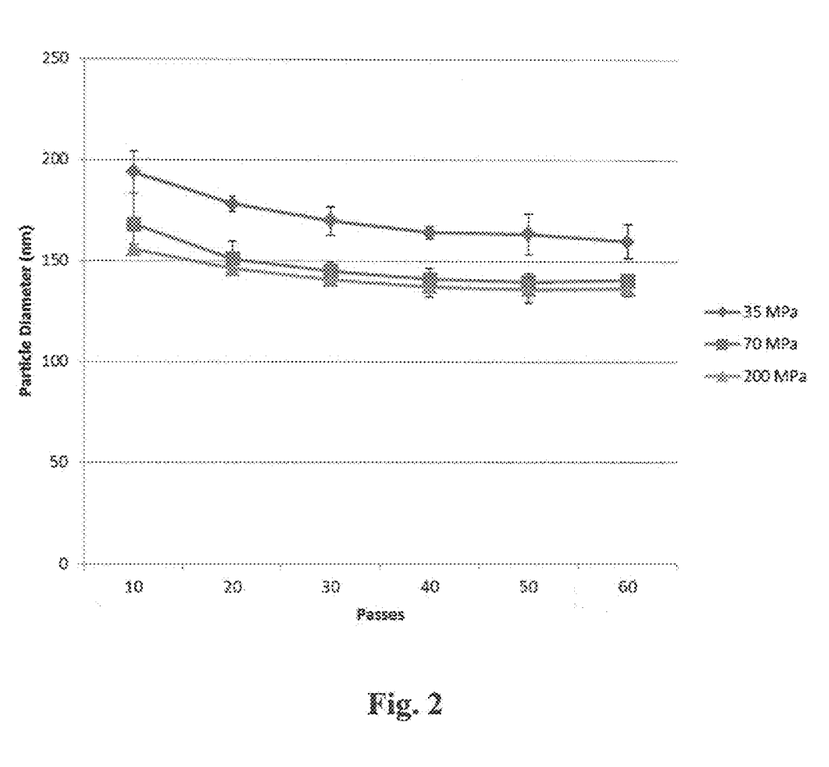
FIG. 2 shows dynamic light scattering of homogenized water-insoluble glucan (B-1118-WT); all experiments were run in triplicate and the values are expressed as a mean value±±S.D. (standard deviation of the mean) as described below.
Figure 3:
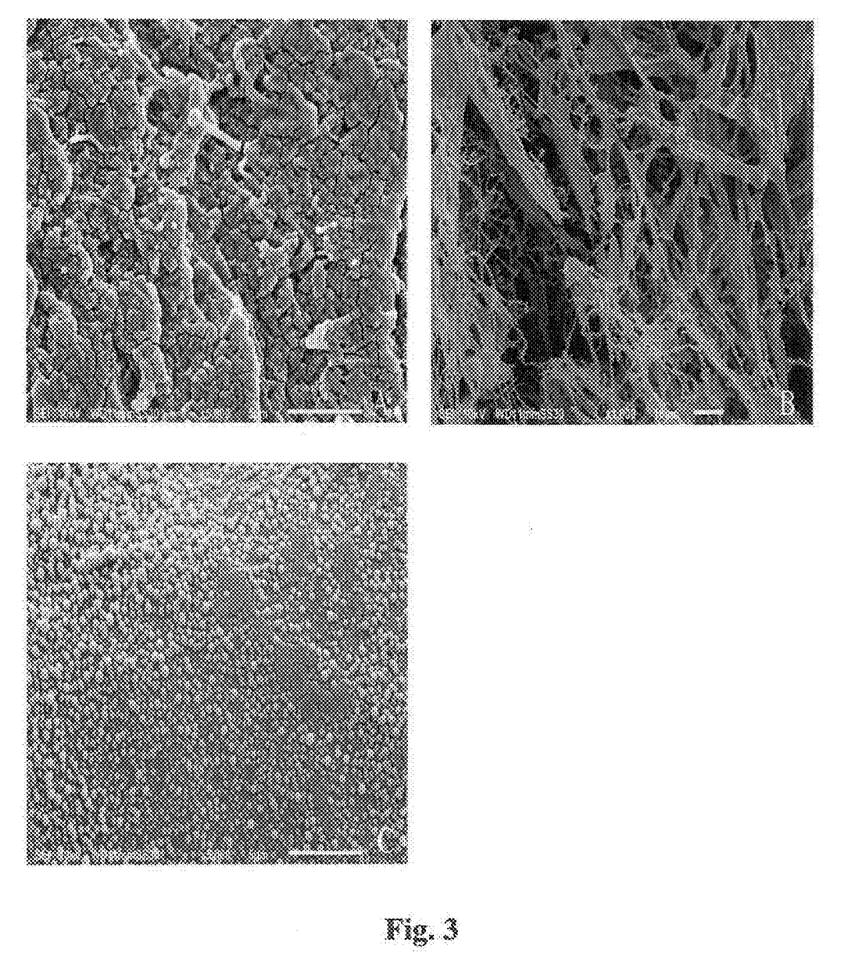
FIG. 3 shows the following as described below: (A) air dried glucan (B-1118-WT), (B) freeze-dried glucan (B-1118-WT), (C) freeze-dried glucan (B-1118-WT) after homogenization.

The purified water-insoluble glucan was suspended in water at room temperature, and once complete hydration/dispersion was achieved, homogenization of the water-insoluble glucan was evaluated at pressures of 35, 70 and 200 MPa using an Avestin Emulsiflex-C5 high pressure homogenizer. The concentration of dispersed glucan used was limited only by what was passable through the homogenizer, which in our case was roughly 5% solid content by weight. For the following experiments a solid content of 0.25% was used. The glucan was homogenized for 10 to 60 passes for each pressure with 10 passes through the homogenizer required to obtain a clear suspension (FIG. 1) at 35 MPa. These suspensions were analyzed using dynamic light scattering (DLS) (Brookhaven 90 Plus Particle Size Analyzer) after filtration through a 0.45 micron syringe filter to remove larger particles such as dust. The results are shown in Table 1 and FIG. 2. Homogenization at 35 MPa surprisingly resulted in a decrease of average diameters of 193.80±10.41 nm to 159.83±8.32 nm when increasing from 10 to 60 passes. One-way ANOVA analysis indicated significance with a p-value less than 0.002. Overall diameters were observed to surprisingly exhibit a substantial decrease in size when the glucan was homogenized at 70 MPa with sizes ranging from 167.83±15.5 to 140.53±2.27 nm (p-value<0.008). Homogenization at 200 MPa surprisingly did not drastically decrease the diameter of the nanoparticles compared to those at 70 MPa, producing particles with average diameters of 155.63±2.23 nm at 10 passes and 136.53±3.69 nm at 60 passes (p-value, 0.001). In order to get a clear view of the surface morphology of the structures responsible for the DLS results, three samples were observed under scanning electron microscopy (JEOL JSM-6010A). All dried samples were adhered to aluminum specimen mounts by conductive carbon tape and then sputter coated with gold. The image in FIG. 3A was taken from freshly prepared glucan rinsed extensively with water and then allowed to air dry. While it was not a uniform distribution it can be seen that much of the structure seemingly existed as agglomerated spheres; however, after freezing the sample in a −20°C. freezer, the spheres were surprisingly all but destroyed, FIG. 3B. Surprisingly, when the freeze dried glucan was subjected to homogenization. FIG. 3C, the glucans had assembled into nanospheres, with average sizes similar to that of the DLS data.

The process was also carried out on several other water insoluble glucans produced by B-1118, B-1118 mutants I, R, S, Y, and Q. B-523, and B-1121. The DLS data is shown in Table 1. Surprisingly, the method seems to be applicable to a range of water-insoluble glucans that maintain a particular composition of α-(1→3)-linked and α-(1→6)-linked D-glucose units. In our studies, it was determined that nanoparticles were synthesized from glucans whose α-(1→3)-/α-(1→6)-linkage ratio was between about 0.2 and about 6 (e.g., 0.2-6). The glucans with ratios of about 2 and below yielded more nanoparticles than those above 2.

We have thus described the preparation of nanospheres from water-insoluble glucans produced by the glucansucrase of *Leuconostoc mesenteroides*. The nanoparticles, between 140 and 200 nm in diameter, were easily prepared using only high-pressure homogenization. We are currently exploring their potential applications as molecular delivery vehicles and as precursors for films, coatings, fibers and adhesives, as well as potential chemical modifications to prepare new derivatives that may yield access to new materials.

Synthesis of water-insoluble glucan nanospheres: The nanospheres were prepared as described above. Briefly, 100 mg of the water-insoluble glucan was suspended in 40 mL of water at room temperature and allowed to stir until completely dispersed, roughly 15 minutes. The unstable suspension was then homogenized at 35 MPa for 60 passes using an Avestin Emolsiflex-C5 high pressure homogenizer. The resulting clear suspension was filtered using a 0.45 micron syringe filter and used without further purification.

Film Casting: The nanosphere suspensions were allowed to air dry in a dust free environment until clear films were obtained. Film casting was done on either polytetrafluoroethylene (PTFE) coated surfaces or silicone trays in order to minimize adherence of the formed film to the surface.

Incorporation of Cellulose Nanofibers (CNF); Spray dried cellulose nanofibers (purchased from the University of Maine Process Development Center) were added to the suspension of glucan nanospheres prior to film casting, between 10 and 50% by weight compared to that of the nanosphere suspension solid content. This was allowed to stir for 24 hours and was then poured into a silicone tray and allowed to dry via exposure to the atmosphere in a dust free environment. CNF/nanosphere glucan films were also prepared by introducing the CNF into the homogenization process.

Scanning electron microscopy (SEM): Two types of sample preparation for SEM imaging were performed. In the first preparation, formed films were transferred to sample mounts and then sputter coated with gold. The second preparation involved the formation of the films on the mounts by applying small amounts of the nanosphere suspension to the adhesive tape bearing mounts and allowing them to air dry in a dust free environment. These were then sputter coated with gold before imaging.

Atomic force microscopy (AFM): A dilute sample of the suspension was deposited onto mica disks and allowed to dry overnight in a dust free environment Samples were then analyzed using tapping, mode in air via a VEECO multimode Nanoscope iV at a resolution of 1024×1024 pixels.

Results and Discussion: Previous preliminary studies on the glucan nanospheres show that the zeta potential of the particles were not strong enough to induce a significant repellant force in solution with zeta potentials ranging from −5 to 5 mV; this indicated that in the absence of water, sufficient adherence to one another may result in the formation of a film based on the hydrophilic interactions of the particle surfaces. When the water from these suspensions was allowed to evaporate, we found that films did indeed form and interesting physical characteristics were surprisingly observed).

Figure 4:
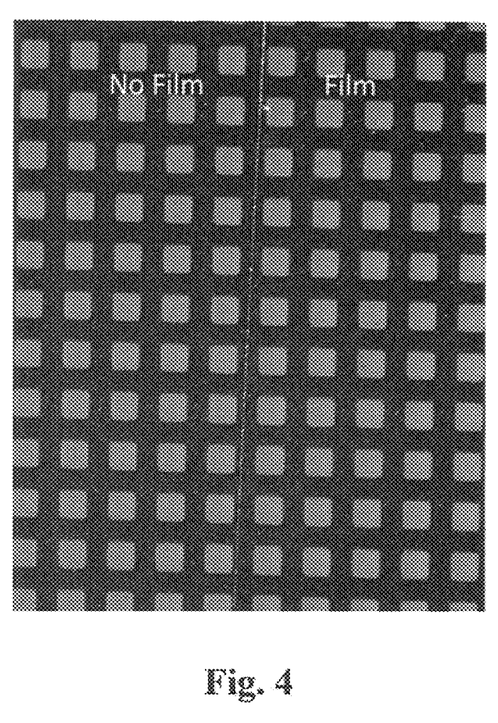
FIG. 4 shows photograph depicting clarity of a film as described below.

The resulting, films were surprisingly transparent has shown in FIG. 4, with enough tensile strength and flexibility to allow the films to be bent more than 90 degrees. While these particles were in a different physical form than the original starting material, they had no differing chemical properties. However, unlike the water insoluble glucan, they had an increased surface area and have potential for encapsulation, coating, films, and molecular delivery.

Figure 5:
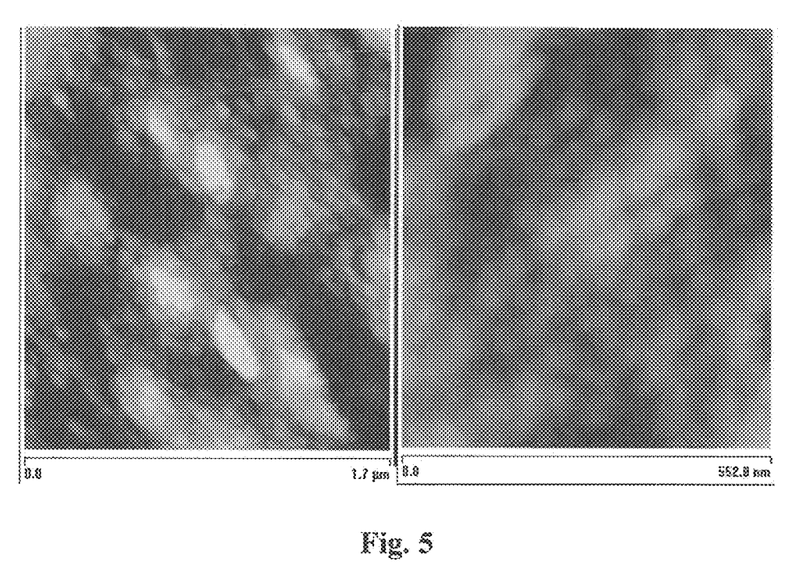
FIG. 5 shows AFM (Atomic force microscopy) images of glucan nanosphere films as described below.
Figure 6:
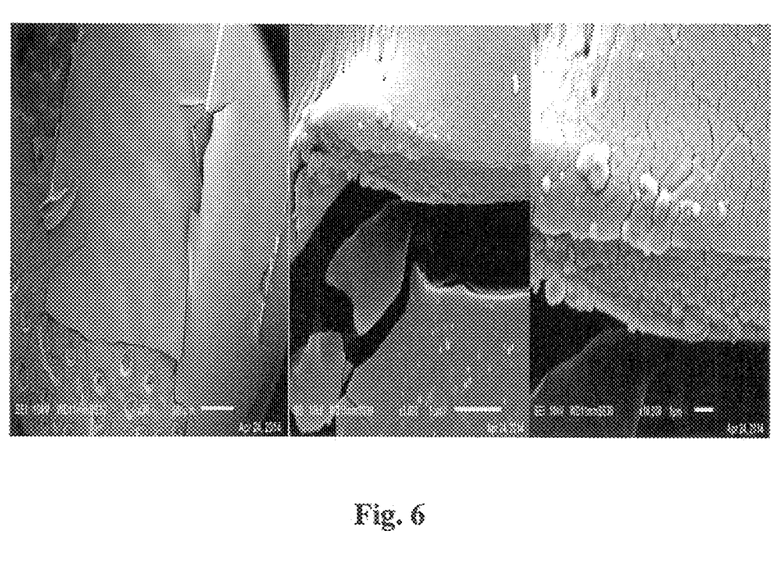
FIG. 6 shows SEM (Scanning electron microscopy) images of films as described below.

Through our previous investigations into these nanospheres, we knew that in solution, or when lyphilized with appropriate freezing techniques, the particles are between 100 and 200 nm in diameter; however, the clarity of these films indicated that perhaps when cast into films, the particles surprisingly "shrink" to a smaller size. This was what we found upon analysis of the films under AFM as shown in FIG. 5. This was supported to a lesser degree by some scanning electron microscopy; however, it is believed that the sputter coating process along with the imaging itself caused some deformation and "expansion cracks" in the film as shown in FIG. 6.

The films were naturally flexible to a degree. Creasing the films more often than not caused tearing and, due to the nature of the components, were re-dispersible in water as the particles were no longer forced to bind to each other and could then associate with the aqueous media.

Figure 7:
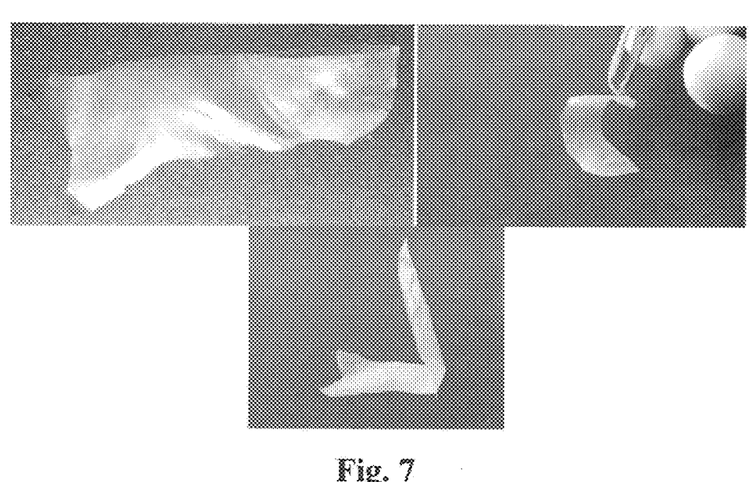
FIG. 7 shows films comprised of nanospheres and CNF (cellulose nanofibers) as described below.

Cellulose nanofibers were purchased from the University of Maine in order to see the changes in properties when mixed with the nanospheres prior to film casting. FIG. 4 shows that the resulting films, while no longer as clear as previous films, surprisingly exhibited an apparent increase in tensile strength and flexibility as shown in FIG. 7.

Synthesis of nanoparticles: The water-insoluble glucans were prepared as above. A typical process of producing the nanoparticles was as follows: 100 mg of the glucan was dissolved in 20 mL of 1 M sodium hydroxide. This mixture was added slowly to 40 mL of an absolute ethanol solution of 0.25% (w/v) surfactant via syringe pump (1 ml per minute) while stirring at vortexing speed. The mixture was then sonicated using a Tekmar sonic disruptor for five minutes (40% power output, 50% pulse). This suspension was then briefly centrifuged and the resulting supernatant was decanted. Fresh deionized water was added to the precipitated particles. The suspensions were then dialyzed against deionized water to remove excess surfactants and neutralize the aqueous media.

In the case of poly(vinyl alcohol) coated nanoparticles, the surfactant was not added initially into the ethanol. After centrifugation, the suspension was dialyzed against a 0.25% (w/v) aqueous solution of poly(vinyl alcohol).

Particle Size: Processed nanoparticles were filtered through a 0.45 Micron syringe filter to remove larger particles, such as dust, prior to measurements. Particle size was then determined via dynamic light scattering (DLS) on a Nicomp PSS 380.

Scanning electron microscopy (SEM): Particles coated with Plutonic® F-68 were dried in a dust free environment and adhered to aluminum specimen mounts by conductive carbon tape. After gold sputtering, images were taken on a JEOL JSM-6010A electron microscope. The example of surfactant used, Pluronic® F-68 (Polyoxyethylene-polyoxypropylene block copolymer), is a solid, BioReagent; CAS Number 9003-11-6; linear Formula $(C_3H_6O.C_2H_4O)_x$; MDL number MFCD00082049; PubChem Substance ID 24898182.

Results: The dynamic light scattering results from the nanoparticles with different surfactants can be seen in Table 3. The addition of surfactants surprisingly contributed to a large increase in particle size, with the sodium dodecyl sulfate particles having the largest diameter of around 455 nm and Pluronic® F-68 having the smallest at 303 nm.

Figure 8:
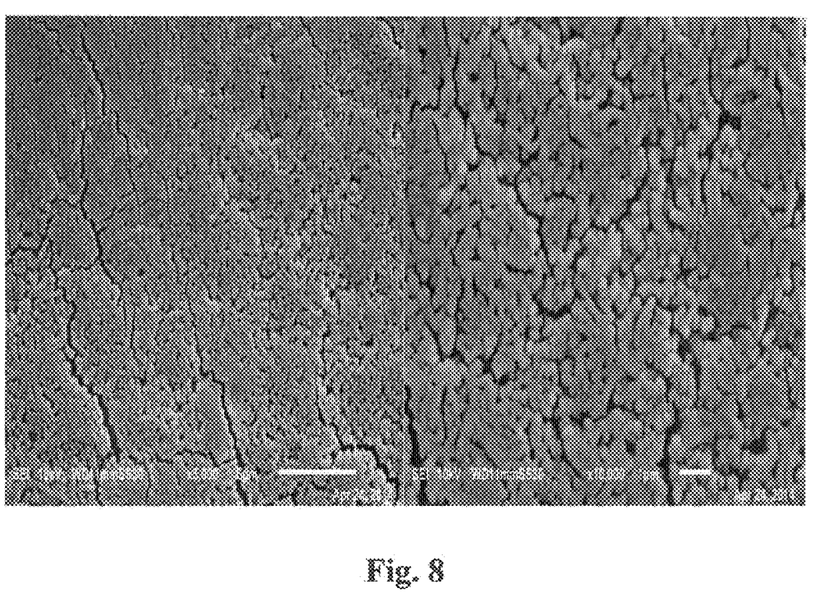
FIG. 8 shows SEM imaging of Pluronic® F-68 coated nanoparticles (from B-1118-WT) as described below.

The Pluronic® F-68 coated particles were evaluated via scanning electron microscopy which showed the spherical nature of the particles with sizes relatively similar to those seen by DLS, FIG. 8.

All of the references cited herein, including U.S. Patents, are incorporated by reference in their entirety.

Thus, in view of the above, there is described (in part) the following:

Nanoparticles composed of water insoluble glucans, said nanoparticles produced by a process comprising (consisting essentially of or consisting of) suspending water insoluble glucans in water to produce a suspension, homogenizing said suspension in a high pressure homogenizer for about 10 to about 60 times to produce a clear suspension containing said nanoparticles, and filtering said suspension using a filter to purify said nanoparticles. The above nanoparticles, wherein said nanoparticles have a diameter of about 100 to about 500 nm (e.g., 100-500nm; preferably about 130 to about 210 nm (e.g., 130-210 nm)). The above nanoparticles, wherein said water insoluble glucans have α-(1→3)-/α-(1→6)-linkage ratio between about 0.2 and about 6 (e.g., 0.2 to 6). The above nanoparticles, wherein said process comprises homogenizing said suspension at a pressure about 35 to about 200 MPa (e.g., 35 to 200 MPa). The above nanoparticles, wherein said filter has pores of about 0.45 microns (e.g., 0.45 microns).

Films composed of the above nanoparticles.

A process for producing nanoparticles composed of water insoluble glucans, said process comprising (consisting essentially of or consisting of) suspending water insoluble glucans in water to produce a suspension, homogenizing said suspension in a high pressure homogenizer for about 10 to about 60 times to produce a clear suspension, and filtering said suspension using a filter to purify nanoparticles.

Surfactant stabilized nanoparticles composed of water insoluble glucans, said nanoparticles produced by a process comprising (consisting essentially of or consisting of) dissolving water insoluble glucans in to basic solution (e.g., a solution made alkaline by addition of a strong base such as sodium hydroxide or potassium hydroxide of at least 0.5M final concentration) to form a glucan solution, adding said glucan solution to an alcohol solution containing a surfactant while stirring followed by cooling at about 0° C. to about 10° C. (e.g., 0 to 10° C.; preferably about 0° C. to about 5° C. (e.g., 0° C. to 5° C.)) and sonication at about 180 to about 420 watts (e.g., 180 to 420 watts) at about a 50% pulse rate (e.g., 50%) for about 3 to about 7 minutes (e.g., 3 to 7 mimics) to form a suspension, containing nanoparticles, centrifuging said suspension to isolate the precipitate, adding deionized water to said precipitate and dialyzing against deionized water to remove excess surfactants and base; if said surfactant is poly(vinyl alcohol) then said surfactant is not in said alcohol solution but is in said deionized water. The above nanoparticles, wherein said water insoluble glucans have α-(1→3)-/α-(1→6)-linkage ratio between about 0.2 and about 6.

Films composed of the above nanoparticles.

A process for producing surfactant stabilized nanoparticles composed of water insoluble glucans, said process comprising (consisting essentially of or consisting of) dissolving water insoluble glucans in a basic solution to form a glucan solution, adding said glucan solution to an alcohol solution containing a surfactant while stirring followed by cooling at about 0° C. to about 10° C. and sonication at about 180 to about 420 watts at about a 50% pulse rate for about 3 to about 7 minutes to form a suspension containing nanoparticles, centrifuging said suspension to isolate the precipitate, adding deionized water to said precipitate and dialyzing against deionized water to remove excess surfactants and base; if said surfactant is poly(vinyl alcohol) then said surfactant is not in said alcohol solution but is in said deionized water.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

| Pressure (MPa) | Passes | | | | | |
|---|---|---|---|---|---|---|
| | 10 | 20 | 30 | 40 | 50 | 60 |
| 35 | 193.8 | 178.1 | 169.8 | 164.1 | 163.4 | 159.8 |
| 70 | 167.8 | 151.0 | 145.1 | 140.9 | 139.7 | 140.5 |
| 200 | 155.6 | 146.1 | 140.7 | 137.4 | 136.0 | 136.5 |

TABLE 2

| Strain | Size (nm) | Polydispersity (PDI) |
|---|---|---|
| B-1118-I | 213.2 ± 1.3 | 0.196 ± 0.018 |
| B-1118-R | 482.0 ± 9.7 | 0.271 ± 0.017 |
| B-1118-S | 217.4 ± 1.6 | 0.140 ± 0.021 |
| B-1118-Y | 281.0 ± 2.8 | 0.138 ± 0.024 |
| B-1118-Q | 218.4 ± 2.6 | 0.113 ± 0.016 |
| B-1118 | 108.3 ± 5.5 | 0.253 ± 0.026 |

TABLE 2-continued

| Strain | Size (nm) | Polydispersity (PDI) |
|---|---|---|
| B-523 | 115.2 ± 2.3 | 0.174 ± 0.011 |
| B-23311 | 227.6 ± 3.4 | 0.144 ± 0.031 |
| B-59839 | 211.9 ± 3.3 | 0.248 ± 0.014 |

B-1118-I, B-1118-R, B-1118-S, B-1118-Y and B-1118-Q were prepared as previously described (Côté, G. L., and C. D. Skory, Effects of mutations at threonine-654 on the insoluble glucan synthesized by *Leuconostoc mesenteroides* NRRL B-1118 glucansucrase, Applied Microbiology and Biotechnology, 98 (15): 6651-6658 (2014)), except that the cloned enzyme was expressed in *Lactococcus lactis*.
B-1118 was isolated in the 1950s directly from sucrose-grown *Leuconostoc mesenteroides* B-1118. Its analysis was described by Pearce et al. (Pearce, B. J., et al., Enzymic and methylation analysis of dextrans and (1→3)-α-D-glucans, Carbohydrate Research, 203: 229-246 (1990)).
B-523 was prepared as described by Pearce et al. (Pearce, B. J., et al., Enzymic and methylation analysis of dextrans and (1→3)-α-D-glucans, Carbohydrate Research, 203: 229-246 (1990)).
B-23311 was prepared as described by Cote et al. (Cote, G. L., et al., Some structural features of an insoluble α-D-glucan from a mutant strain of *Leuconostoc mesenteroides* NRRL B-1355, Journal of Industrial Microbiology and Biotechnology, 23: 656-660 (1999) and by Côté and Leathers (Côté, G. L., and T. D. Leathers, Insoluble glucans from planktonic and biofilm cultures of mutants of *Leuconostoc mesenteroides* NRRL B-1355, Applied Microbiology and Biotechnology, 82: 149-154 (2009)).
B-59839 was prepared as described by Côté et al. (Côté, G. L., et al., The production of glucans via glucansucrases from *Lactobacillus satsumensis* isolated from a fermented beverage starter culture, Applied Microbiology and Biotechnology 97 (16): 7265-7273 (2013)).

TABLE 3

| Surfactant | Mean Particle Diameter |
|---|---|
| Pluronic F-68 | 303.11 |
| Sodium Dodecyl Sulfate (SDS) | 455.7 |
| Poly(vinyl alcohol) (MW ~38000) | 361.23 |
| No Surfactant | 250.55 |

We claim:

1. Nanoparticles composed of water insoluble glucans, said nanoparticles produced by a process comprising suspending water insoluble glucans in water to produce a suspension, homogenizing said suspension in a high pressure homogenizer for about 10 to about 60 times to produce a clear suspension containing said nanoparticles, and filtering said suspension using a filter to purify said nanoparticles.

2. The nanoparticles according to claim 1, wherein said nanoparticles have a diameter of about 100 to about 500 nm.

3. The nanoparticles according to claim 1, wherein said water insoluble glucans have α-(1→3)-/α(1→6)-linkage ratio between about 0.2 and about 6.

4. The nanoparticles according to claim 1, wherein said process comprises homogenizing said suspension at a pressure about 35 to about 200 MPa.

5. The nanoparticles according to claim 1, wherein said filter has pores of about 0.45 microns.

6. Films composed of the nanoparticles of claim 1.

7. A process tor producing nanoparticles composed of water insoluble glucans, said process comprising suspending water insoluble glucans in water to produce a suspension, homogenizing said suspension in a high pressure homogenizer for about 10 to about 60 times to produce a clear suspension, and filtering said suspension using a filter to purify nanoparticles.

8. Surfactant stabilized nanoparticlescomposed of water insoluble glucans, said nanoparticies produced by a process comprising dissolving water insoluble glucans in a basic solution to form a glucan solution, adding said glucan solution to an alcohol solution containing a surfactant while stirring followed by cooling at about 0° C. to about 10° C. and sonication at about 180 to about 420 watts at about a 50% pulse rate for about 3 to about 7 minutes to form a suspension containing nanoparticles, centrifuging said suspension to isolate the precipitate, adding deionized water to said precipitate and dialyzing against deionized water to remove excess surfactants and base; wherein said surfactant is not poly(vinyl alcohol).

9. Films composed of the above nanoparticles of claim 8.

10. A process for producing surfactant stabilized nanoparticles composed of water insoluble glucans, said process comprising dissolving water insoluble glucans in a basic solution to form a glucan solution, adding said gluon. solution to an alcohol solution containing a surfactant while stirring followed by cooling at about 0° C. to about 10° C. and sonication at about 180 to about 420 watts at about a 50% pulse rate for about 3 to about 7 minutes to form a suspension containing nanoparticles, centrifuging said suspension to isolate the precipitate, adding deionized water to said precipitate and dialyzing against deionized water to remove excess surfactants and base; wherein said surfactant is not poly(vinyl alcohol).

11. Surfactant stabilized nanoparticles composed of water insoluble glucans, said nanoparticles produced by a process comprising dissolving water insoluble glucans in a basic solution to form a glucan solution, adding said glucan solution to an alcohol solution optionally containing a surfactant while stirring followed by cooling at about 0° C. to about 10° C. and sonication at about 180 to about 420 watts at about a 50% pulse rate for about 3 to about 7 minutes to form a suspension containing nanoparticles, centrifuging said suspension to isolate the precipitate, adding deionized water containing poly(vinyl alcohol) to said precipitate and dialyzing against deionized water to remove excess surfactants and base.

12. A process for producing surfactant stabilized nanoparticles composed of water insoluble glucans, said process comprising dissolving water insoluble glucans in a basic solution to form a glucan solution, adding said glucan solution to an alcohol solution optionally containing a surfactant while stirring followed by cooling at about 0° C. to about 10° C. and sonication at about 180 to about 420 watts at about a 50% pulse rate for about 3 to about 7 minutes to form a suspension containing nanopartieles, centrifuging said suspension to isolate the precipitate, adding deionized water containing poly(vinyl alcohol) to said precipitate and dialyzing against deionized water to remove excess surfactants and base.

\* \* \* \* \*